(12) United States Patent
Wier et al.

(10) Patent No.: US 7,222,728 B2
(45) Date of Patent: May 29, 2007

(54) ADJUSTABLE SHIELD FOR A CONVEYOR BELT

(75) Inventors: Donald K. Wier, Mansfield, TX (US); Stephen D. Duncan, Arlington, TX (US)

(73) Assignee: Transnorm System Inc., Arlington, TX (US)

( * ) Notice: Subject to any disclaimer, the term of this patent is extended or adjusted under 35 U.S.C. 154(b) by 97 days.

(21) Appl. No.: 11/028,253

(22) Filed: Jan. 3, 2005

(65) Prior Publication Data

US 2006/0144679 A1    Jul. 6, 2006

(51) Int. Cl.
*B65G 23/44* (2006.01)
*B65G 21/08* (2006.01)
*B65G 21/20* (2006.01)

(52) U.S. Cl. .................... 198/816; 198/860.3; 198/840
(58) Field of Classification Search ........ 198/813–816, 198/860.3, 860.4, 860.5, 840
See application file for complete search history.

(56) References Cited

U.S. PATENT DOCUMENTS

| 880,303 | A | * | 2/1908 | Heatherington ............. 198/816 |
|---|---|---|---|---|
| 1,934,481 | A | * | 11/1933 | Beyl ........................... 474/123 |
| 2,939,571 | A | * | 6/1960 | Robertson .................... 198/816 |
| 4,063,636 | A | | 12/1977 | vom Stein |
| 4,117,923 | A | | 10/1978 | Werntz |
| 4,396,112 | A | | 8/1983 | von Wietersheim et al. |
| 4,399,908 | A | | 8/1983 | Gunti |
| 4,488,639 | A | | 12/1984 | Vogt et al. |
| 4,583,903 | A | | 4/1986 | Hutchinson |
| 4,781,283 | A | | 11/1988 | Bentley et al. |
| 4,954,066 | A | | 9/1990 | Leary et al. |
| 5,174,435 | A | * | 12/1992 | Dorner et al. .............. 198/806 |
| 5,971,137 | A | | 10/1999 | Grant et al. |
| 6,279,733 | B2 | * | 8/2001 | Eltvedt ........................ 198/816 |
| 6,708,817 | B2 | * | 3/2004 | Klabisch et al. ............ 198/813 |
| 6,860,383 | B2 | * | 3/2005 | Veit et al. .................... 198/815 |
| 6,959,803 | B1 | * | 11/2005 | Layne et al. ................ 198/600 |

* cited by examiner

*Primary Examiner*—Mark A. Deuble
(74) *Attorney, Agent, or Firm*—Kenneth F. Pearce

(57) ABSTRACT

The present invention is related to an adjustable finger guard or shield for a conveyor. The housing's slide can include the combination of a plate, one or more connectors and a rotable bearing's housing. Moving the slide from a first direction to a second directions alters the position of the shaft of the conveying drum driving the conveyor belt.

17 Claims, 5 Drawing Sheets

ADJUSTABLE SHIELD FOR A CONVEYOR BELT

BACKGROUND OF THE INVENTION

1. Field of the Invention

Among other things, the present invention is related to a finger guard or shield for a conveyor and a conveyor belt. More specifically, the current invention is an adjustable shield for one or more conveyor belt interlockers. The interlockers grip the belt as the belt circulates about the conveyor and can also ride in the belt holders positioned about the conveyor. A belt interlocker navigates through the shield as the continuous conveyor belt traverses its pathway. Within the scope of the present invention, a slide can include the combination of a plate, one or more connectors and a rotable bearing's housing. The combination allows the position of the shaft of the conveying drum to be altered from a first direction to a second direction.

2. Description of the Previous Art

1) U.S. Pat. No. 4,117,923—Werntz enables a drive for roller conveyors. The Werntz removable guard 34 is not adjustable, and among other things, the '923 patent is silent regarding any slide plate and rotable bearing housing combination. Finally, the Werntz guard does not encase one or more belt interlockers.

2) U.S. Pat. No. 4,954,066—Leary, et al. enables a conveyor chain guide apparatus. FIGS. 2–4 show L-shaped guard 74. And the Leary Abstract teaches, "The chain guide includes a support rail structure for supporting an upper run of conveyor chain, and a spring steel cover sheet overlying a track . . . . The chain includes a series of spikes to penetrate a plastic sheet and thereby carry it through the machine . . . . " The '066 patent does not teach or suggest a guard encasing one or more belt interlockers.

3) U.S. Pat. No. 4,396,112—von Wietersheim, et al. enables a conveyor and support structure. FIG. 14 of the '112 patent teaches chain guard 309 and welded guard plate 302. Column 13 of von Wietersheim discloses, "The screw connection which faces the end of the conveyor in FIG. 14 serves to fasten an attachment plate 307 (FIG. 15) of the chain guard 309, said attachment plate being provided on the side facing away from the conveyor, with a long notch 308 for engaging the bolt of the screw connection 306 and being welded to the upper edge of the outer side of a screening plate 310 which extends, at right angles to the attachment plate, parallel to the main side of the attachment plate, parallel to the main side of the side piece 220 and which covers with its outer margin to cut-out 297 in the side piece." Among other things, the '112 patent does not disclose a slide plate and rotable bearing housing combination for a finger guard.

4) U.S. Pat. No. 4,583,903—Hutchinson enables an apparatus for bottom unloading of storage structures. FIG. 5 discloses guard 19. Among other things, Hutchinson does not disclose a slide plate and rotable bearing housing combination for a finger guard.

5) U.S. Pat. No. 4,063,636—vom Stein enables a disconnectable driving roller for roller conveyors. Although not specifically delineated in the vom Stein patent, 46 appears to disclose a finger guard for chain 22. The '636 patent does not teach or suggest a guard encasing one or more belt interlockers. Vom Stein is also silent regarding an adjustable finger guard.

6) U.S. Pat. No. 4,781,283—Bentley, et al. enables an accumulation conveyor. FIG. 3 discloses an upper guard 9 and a lower guard 12. The '283 patent does not teach or suggest a guard encasing one or more belt interlockers. Bentley is also silent regarding an adjustable finger guard.

7) U.S. Pat. No. 4,488,639—Vogt, et al. enables roller conveyor with friction roll device. Column 3 reads, "The sleeve 72 is mounted on a bolt 78 which forms an axle therefor, the bolt 78 being cantilevered at its head end in an opening 80 in the inner side rail 53 and extends horizontally therefrom. Each bolt 78 assists in the support of one of the chain guide carrier bracket 82, and also supports a finger guard 84 and a pair of guards 86 and 88, which are referred to as 'shingle' guards because they are mounted in overlapping relation similarly to shingles." Vogt is silent regarding the practice of an adjustable finger guard for one or more belt interlockers.

8) U.S. Pat. No. 5,971,137—Grant, et al. enables a power roller conveyor. Grant discloses guard or belt support 18. Grant does not teach or suggest an adjustable finger guard for one or more belt interlockers.

9) U.S. Pat. No. 4,399,908—Gunti enables some elements for conveyors, and in particular, web member 12 that has U-web member 26 and side wall 27. U-web member 36 and side wall 27 appear to form a type of finger guard for the Gunti chains. Among other things, Gunti does not teach or suggest a guard encasing one or more belt interlockers.

SUMMARY OF THE INVENTION

Unlike traditional conveyor finger guards, the current shield can adjusted to changes the position of the shaft of a conveying drum from a first to a second position, which, in turn, alters the position of the conveyor drum. Altering the position of the conveying drum changes the tension applied to the conveyor belt. The present shield includes an inward and outward side, with the inward side being proximate to one or more belt interlockers circulating with endless loop belt. The inward and outward side include openings for receiving the shaft. One or more connectors extend through apertures in the sidewall of the outward side or mount. In select embodiments, the connectors connect a plate on the inward side of the mount and the rotable bearing on the outward side of the mount to create a type of slide in accordance with the present invention. The shaft extends into the rotable bearing. When the fasteners securing the slide to the mount are loosened, the slide can be moved from a first position to a second position, thereby altering the direction of the shaft. Select embodiments can be provided with an adjuster for limiting the motion of the slide.

An aspect of the present invention is to provide an adjustable shield or finger guard for a conveyor belt.

Still another aspect of the present invention is to provide an adjustable shield including a slide.

It is another aspect of the present invention to enable a method of shifting the shaft of a conveyor drum from a first direction to a second direction.

Yet another aspect of the present invention is to provide a slide that includes a plate and a housing for a rotable bearing.

An embodiment of the present invention can be described as an adjustable shield encasing an end of a continuous conveyor belt comprising: an outward side, comprising: a plurality of apertures; and a plurality of openings for receiving an anchor for securing the adjustable shield to a conveyor frame; an inward side comprising: a first bolt extending through a first one the apertures and a second bolt extending through a second one the apertures; a housing attached to the first bolt and the second bolt, wherein the housing further includes a rotable bearing for receiving a shaft; a first fastener for the first bolt and a second fastener for the second bolt.

Another embodiment of the present apparatus can be described as an adjustable shield encasing an end of an endless loop conveyor belt comprising: a mount for mounting the adjustable shield further comprising: a base for receiving an anchor for securing the adjustable shield to a conveyor frame; and a sidewall further including a plurality of apertures; and a slide, further comprising: a first side having a curvilinear rim positioned at an edge thereof; a first connector and a second connector; and a rotable bearing such that said slide can traverse along the sidewall.

Yet another embodiment of the present device can be described as a method of altering direction of a shaft of a conveyor's driving drum, from a first to a second direction comprising the steps of: loosening a first fastener of the first connector the slide; loosening a second fastener of the second connector of the slide; tightening or loosening an adjuster contacting the housing of the rotable bearing of the slide; forcing the slide from the first to the second direction; insuring the adjuster contacts the housing; and tightening both fasteners.

In still another embodiment, the present invention can be described as an adjustable shield encasing an end of an endless loop conveyor belt comprising: a mount for mounting the adjustable shield to a conveyor frame including a sidewall; a slide, further comprising: a first side; a connector, a rotable bearing and an adjuster.

Yet another embodiment of the present device can be described as a an adjustable shield encasing an end of an endless loop conveyor belt comprising: a mount for mounting the adjustable shield to a conveyor frame; a slide communicating with an inward and an outward side of the mount; and an adjuster.

In still another embodiment, the present invention can be described as an adjustable shield comprising: a mount for mounting the adjustable shield to a conveyor frame and a slide including a groove for coacting with a rider of the mount.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

In the most general sense, the adjustable shield is attached to the conveyor frame near an edge where the conveyor belt will turn as the belt circulates about the conveyor. In operation, the conveyor belt navigates through the shield as one or more interlockers grip the conveyor belt and ride in the belt holders. The present invention is particularly advantageous for continuous or endless loops which circulate in an over and under pathway.

In the practice of the current invention, the driving drum's shaft extends through a plate, a mount and a rotable bearing, and one or more connectors attach the rotable bearing's housing to the adjustable shield. The mount includes a plurality of apertures or slots, and when the connectors are not secured against the adjustable shield, the connectors can slide along the length of the slots. An adjuster extends through an arm of the adjustable shield and the adjuster can upon contacting the rotable bearing's housing limit the sliding movement of the connectors and the plate and the housing to which the connectors are joined. When the connectors' fasteners are loosened, the plate can slide along the inward side of the mount while the rotable bearing's housing slides along the outward side of the mount. In this way, the direction of the shaft and the conveyor drum can be altered from a first direction to a second direction. The combination of one or more of the tightened connectors' fasteners and the adjuster secures the shaft and conveyor drum in the second direction, and as such, the conveyor belt's tension can be altered. Thus, the present invention meets the unfulfilled but long felt need of providing an adjustable shield that allows for the direction of the conveyor drum to be altered, as required by the operator.

Figure 1:
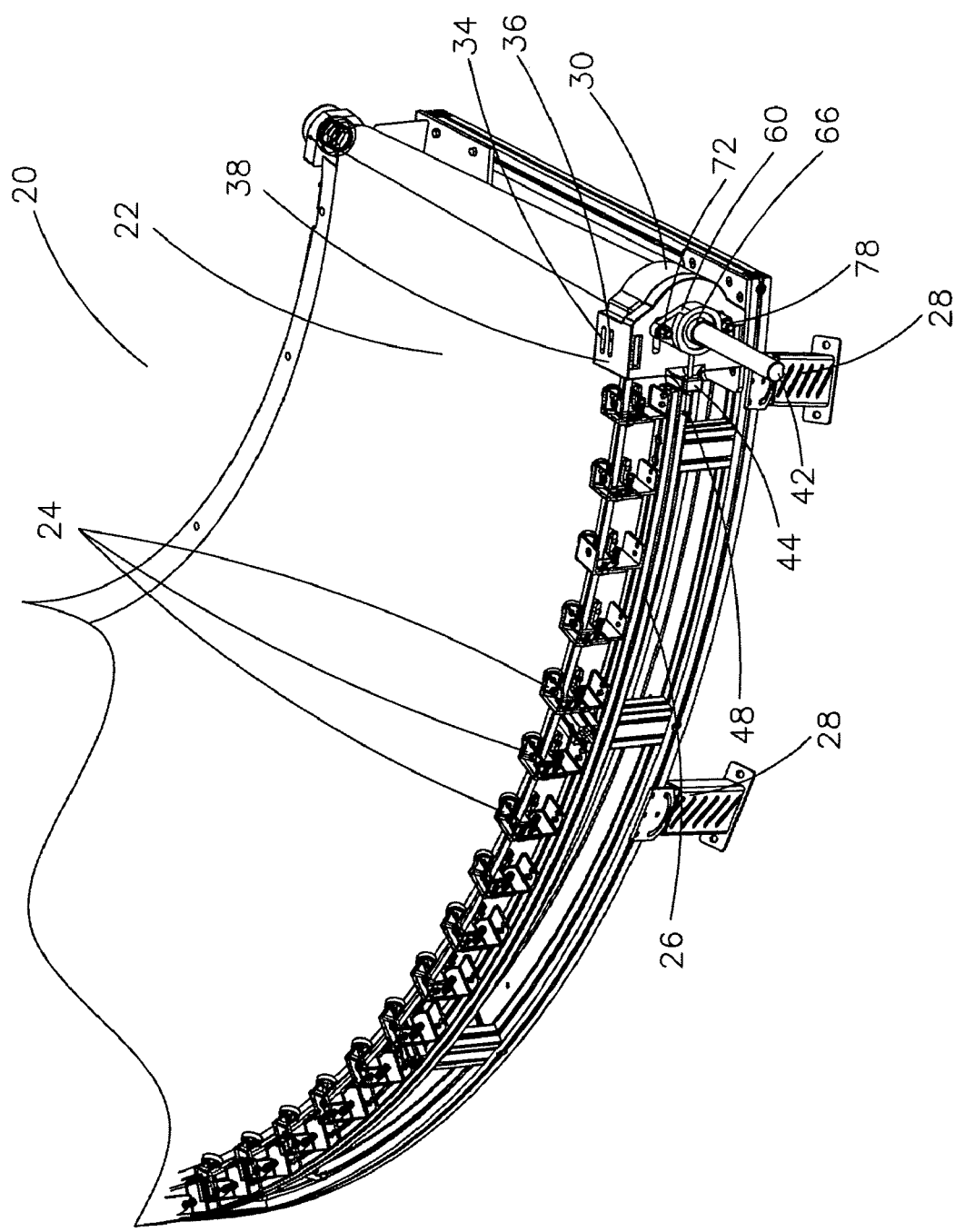
FIG. 1 is a perspective of a conveyor, within the scope of the present invention.

FIG. 1 is a perspective of conveyor (20). Conveyor (20) includes belt (22), belt holders (24), frame (26), legs (28) and adjustable shield or finger guard (30). In operation, one or more beadings or interlockers grip the belt as it navigates through shield (30) as belt (22) circulates about conveyor.

As shown in FIG. 1, adjuster (48) contacts housing (60) of rotable bearing (66). Shaft (42) of the conveyor's driving drum extends through rotable bearing (66). And with reference to FIGS. 1–3, connectors (72) and (78) extend through shield (30) and fasteners (74) and (80) secure housing (66) to adjustable shield (30).

Figure 2:
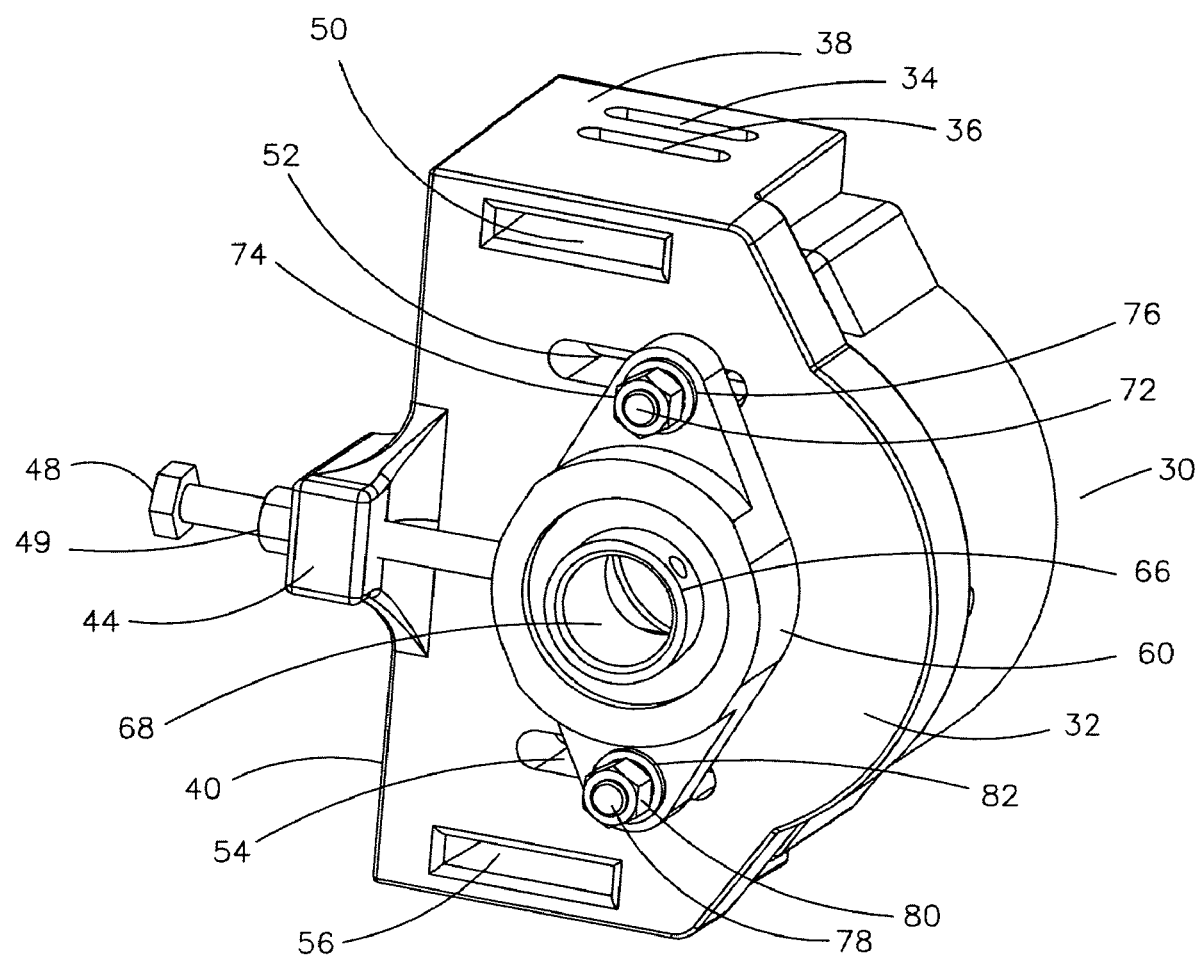
FIG. 2 is a frontal view of the outward side of an embodiment of an adjustable shield, within the scope of the present invention.
Figure 3:
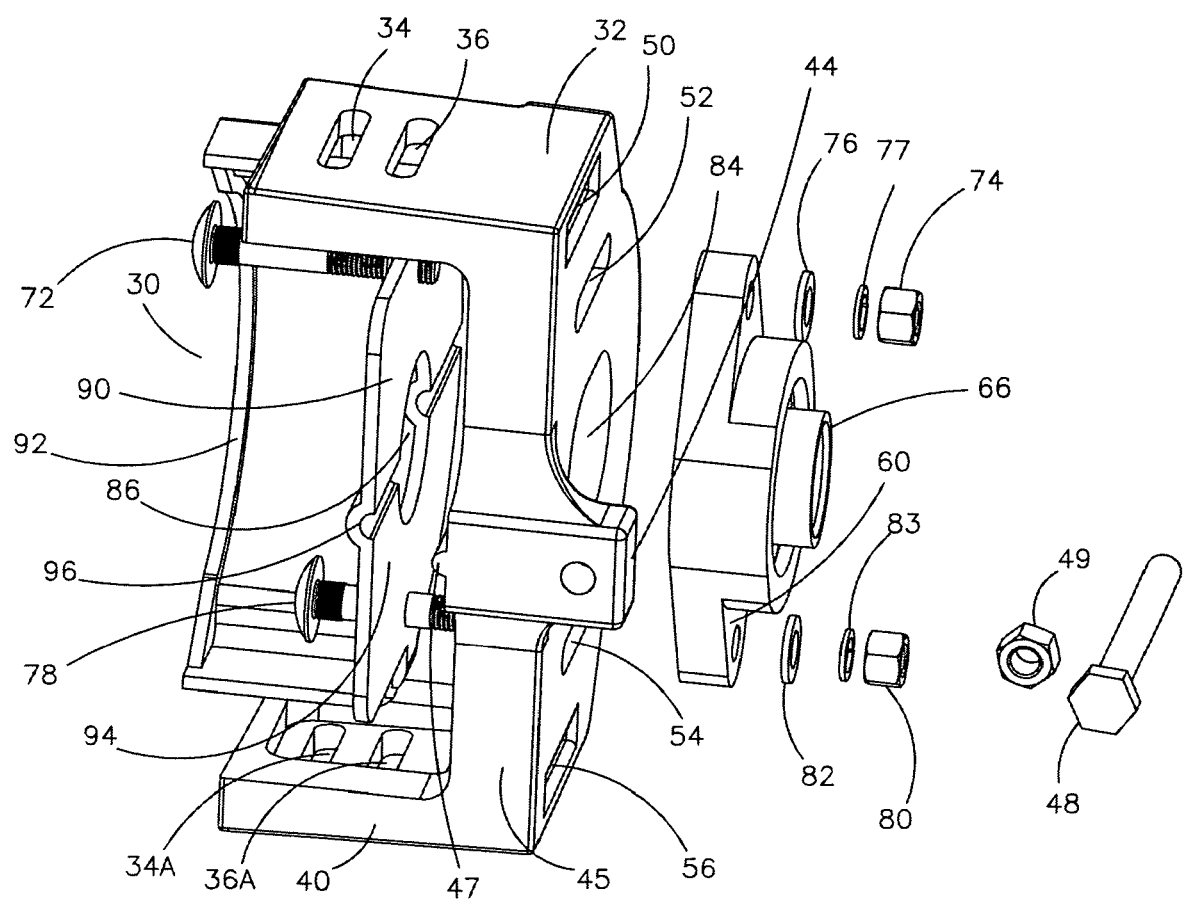
FIG. 3 is an exploded view of an embodiment of an adjustable shield, within the scope of the present invention.

FIG. 2 is a frontal view of the outward side of adjustable shield (30). Outward side or mount (32) includes openings (34) and (36) on its unanchored side (38). And as shown in FIG. 3, adjustable shield (30) also includes a plurality of openings (34A) and (36A) corresponding to openings (34) and (36) in anchored side or base (40). Rising from base (40) is sidewall (44) of finger guard (30).

Positioned on outward side (32) of finger guard (30) is housing (60) that holds rotable bearing (66). In select embodiments, rotable bearing (66) can be a ball bearing. As also shown in FIG. 1, rotable bearing (66) has aperture (68) for receiving shaft (42) of the conveyor's driving drum.

Although the openings are not seen in FIG. 2, housing (60) includes a pair of openings for receiving a pair of connectors. Running through outward side (32) of finger guard (30) are apertures (50), (52), (54) and (56). Extending through aperture (52) and an opening of housing (60) is bolt or connector (72). As best shown in FIG. 3, fastener or nut (74), washer (76) and lock washer (77) can secure housing

(60) against adjustable shield (30). In a similar vein, extending through aperture (54) and an opening of housing (60) is bolt or connector (78). Likewise, fastener or nut (80), washer (82) and lock washer (83) can secure housing (60) against adjustable shield (30).

Returning to FIG. 2, arm (44) of finger guard (30) supports adjuster (48) and nut (49). As shown, adjuster (48) is a torsion adjuster; however, other adjusters that can perform the same function as adjuster (48) can be incorporated into the practice of the present invention. Unless adjuster (48) has been adjusted to prevent connectors (72) and (78) from sliding through the lengths of apertures (52) and (54), when fasteners (74) and (80) are loosened, connectors (72) and (78) and housing (60) can slide along the lengths of apertures (52) and (54).

FIG. 3 is an exploded view of adjustable shield (30) that includes inward side (90), mount (32) and housing (60). In the embodiment depicted in FIG. 3, the combination of inward side (90), connector (72), connector (78), housing (60), apertures (52), (54) and (84), gap (86) and fasteners (74) and (80) create the slide in accordance with the present invention. In practice, when fasteners (74) and (80) are loosened, connectors (72) and (78) can slide along the length of apertures (52) and (54) while shaft (42) can move about aperture (84) and gap (86). As enabled, those skilled in the art recognize that the slide slides along both the inward and outward sides of sidewall (45) of mount (32).

Figure 4:
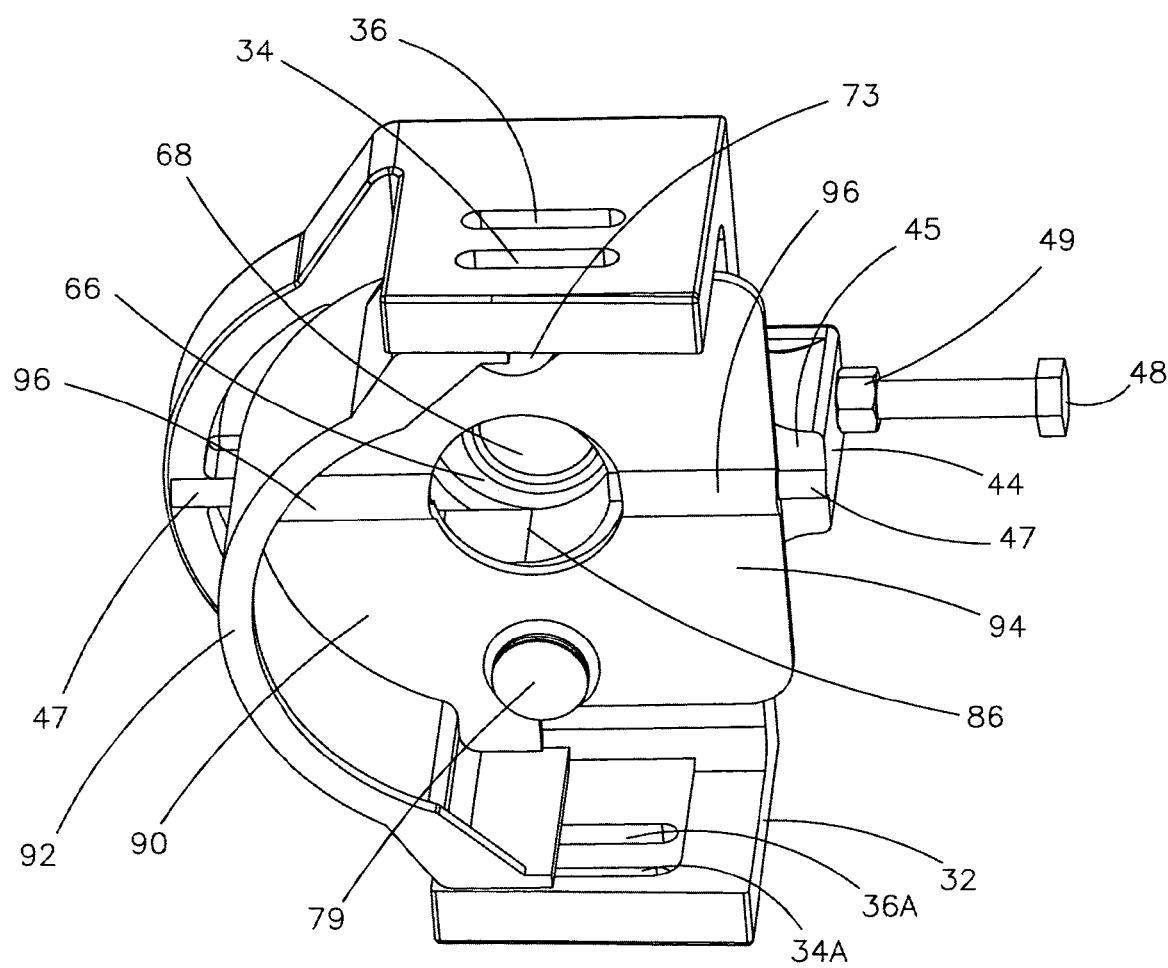
FIG. 4 is a straight on view looking from the inward side toward the outward side of an adjustable shield, within the scope of the present invention.
Figure 5:
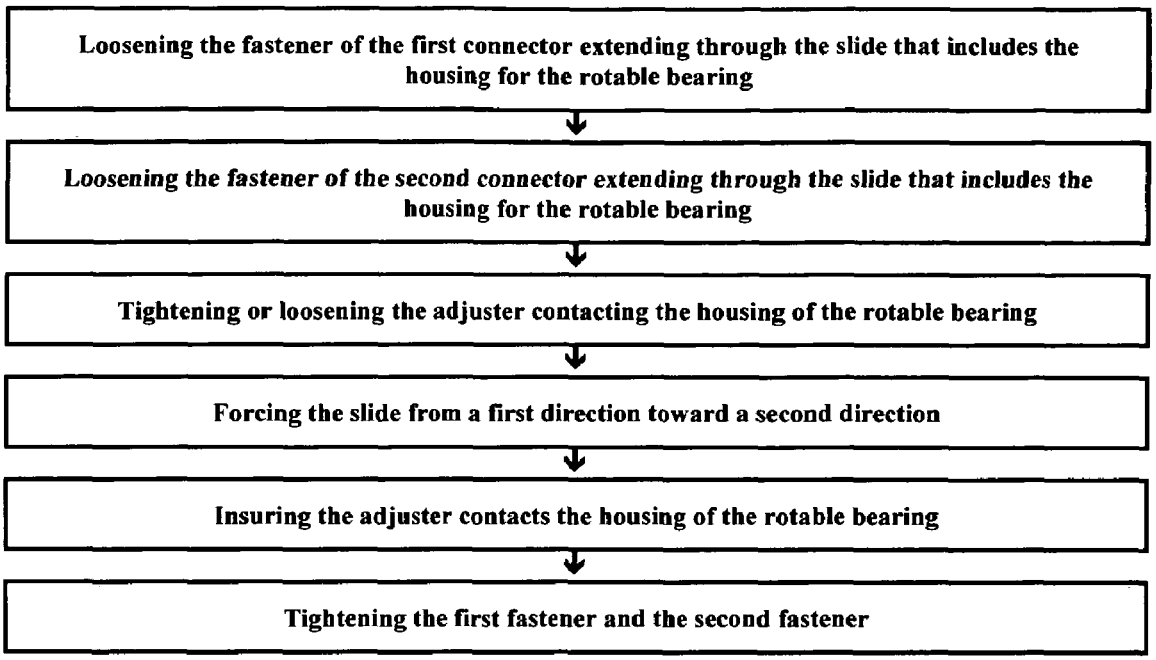
FIG. 5 is a depiction of the steps of an embodiment of the present invention.

With reference to FIGS. 3 and 4, inward side (90) of adjustable shield (30) includes a curvilinear flange (92) attached to a plate (94). In this particular embodiment, plate (94) is manufactured with groove (96) to receive rider (47) of sidewall (45) of outward side (32) of adjustable shield (30). Importantly, the present invention is also functional when plate (94) is provided with a rider and the sidewall is manufactured with a groove. Moreover, the present invention is functional without the use of either rider (47) or groove (96).

With specific reference to FIG. 4, head (73) of connector (72) and head (79) of connector (78) are portrayed. Aperture (68) of rotable bearing (66) is viewed through gap (86) of plate (94). And the rearward side of groove (96) and male projection of rider (47) are shown.

Figure 6:
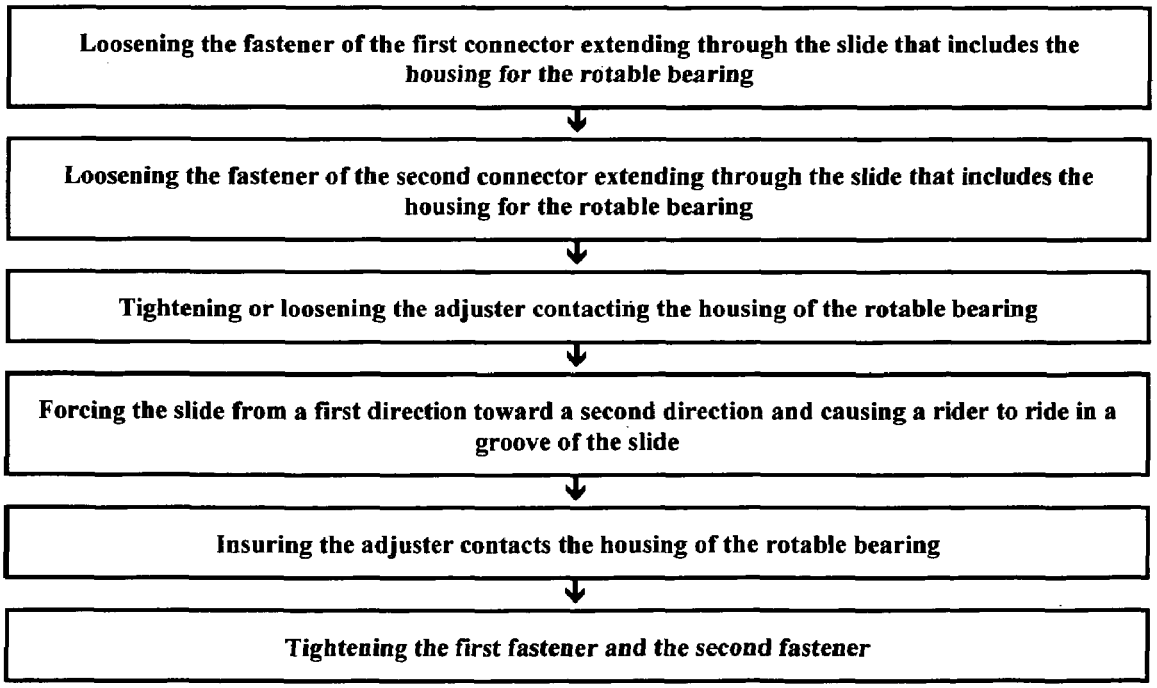
FIG. 6 is an exemplification of the steps of yet another embodiment of the current method.

Steps associated with the practice of the present invention and method are set forth in FIGS. 6–7. Those steps are related to the practice of using the adjustable shield for a conveyor belt structures previously set forth.

Having disclosed the invention as required by Title 35 of the United States Code, Applicant now prays respectfully that Letters Patent be granted for his invention in accordance with the scope of the claims appended hereto.

What is claimed is:

1. An adjustable shield encasing an end of a continuous conveyor belt, wherein said continuous conveyor belt further includes one or more belt interlockers that navigate through said adjustable shield as said continuous conveyor belt circulates; said adjustable shield comprising:
   a) an outward side, comprising:
      a plurality of apertures; and
      a plurality of openings for receiving an anchor for securing said adjustable shield to a conveyor frame;
   b) an inward side, proximate said one or more belt interlockers further comprising a gap for receiving a shaft;
   c) a first bolt extending through said inward side and a first one of said plurality of apertures such that said first bolt can traverse along said first one of said plurality of apertures;
   d) a second bolt extending through said inward side and a second one of said plurality of apertures such that said second bolt can traverse along said second one of said plurality of apertures;
   e) a housing attached to said first bolt and said second bolt further comprising a rotable bearing for receiving said shaft;
   f) a first fastener for said first bolt; and
   g) a second fastener for said second bolt.

2. The invention of claim 1 further comprising an adjuster for adjusting the position of said housing.

3. The invention of claim 2 further comprising a groove in said inward side.

4. The invention of claim 3 further comprising a rider in said outward side.

5. An adjustable shield encasing an end of an endless loop conveyor belt, wherein said endless loop conveyor belt further includes one or more belt interlockers that navigate through said adjustable shield as said endless loop conveyor belt circulates; said adjustable shield comprising:
   a) a mount for mounting said adjustable shield to a conveyor frame further comprising:
      i) a base further comprising a plurality of openings for receiving an anchor for securing said adjustable shield to a conveyor frame; and
      ii) a sidewall further comprising a plurality of apertures; and
   b) a slide, further comprising:
      i) a first side, further comprising:
         A) a gap for receiving a shaft; and
         B) a curvilinear rim positioned at an edge thereof;
      ii) a first connector and a second connector extending from said first side through said plurality of apertures; and
      iii) a rotable bearing, for receiving said shaft, connected to said first connector and said second connector such that said slide can traverse along said plurality of apertures.

6. The invention of claim 5 further comprising an adjuster for adjusting the position of said housing.

7. The invention of claim 6 further comprising a groove in said slide.

8. The invention of claim 7 further comprising a rider in said mount.

9. An adjustable shield encasing an end of an endless loop conveyor belt, wherein said endless loop conveyor belt further includes one or more belt interlockers that navigate through said adjustable shield as said endless loop conveyor belt circulates; said adjustable shield comprising:
   a) a mount for mounting said adjustable shield to a conveyor frame further comprising:
      i) a base further comprising an opening for receiving an anchor for securing said adjustable shield to a conveyor frame; and
      ii) a sidewall further comprising a plurality of apertures;
   b) a slide, further comprising:
      i) a first side;
      ii) a first connector extending from said first side through a first one of said plurality of apertures; and
      iii) a rotable bearing, for receiving a shaft, connected to said first connector such that said slide can traverse along and within said plurality of apertures; and
   c) an adjuster for adjusting the position of said housing.

10. The invention of claim 9, wherein said adjuster is a torsion adjuster.

11. The invention of claim 10 further comprising a second connector extending from said first side through a second one of said plurality of apertures into said rotable bearing.

12. The invention of claim 11 further comprising a groove in said slide.

13. The invention of claim 12 further comprising a rider in said mount.

14. An adjustable shield encasing an end of an endless loop conveyor belt, wherein said endless loop conveyor belt further includes one or more belt interlockers that navigate through said adjustable shield as said endless loop conveyor belt circulates; said adjustable shield comprising:
   a) a mount for mounting said adjustable shield to a conveyor frame; said mount further comprising an opening for receiving a shaft, a first aperture superior to said opening and capable of slidably engaging a first connector and a second aperture inferior to said opening aperture and capable of slidably engaging a second connector;
   b) a slide communicating with an inward and an outward side of said mount, said slide further comprising:
      i) a plate on an inward side of said mount; and
      ii) a housing including a rotable bearing on said outward side of said mount;
   c) an adjuster communicating with said housing; and
   d) a rider coacting with a groove.

15. An adjustable shield encasing an end of an endless loop conveyor belt, wherein said endless loop conveyor belt further includes one or more belt interlockers that navigate through said adjustable shield as said endless loop conveyor belt circulates; said adjustable shield comprising:
   a) a mount for mounting said adjustable shield to a conveyor frame; said mount further comprising a first opening for receiving a shaft and a plurality of apertures outward from said first opening, said plurality of outward apertures capable of engaging one or more connectors, wherein at least two of said plurality of outward apertures are in vertical alignment with the center of said first opening;
   b) a slide communicating with an inward and an outward side of said mount, said slide further comprising:
      i) a plate on an inward side of said mount; and
      ii) a housing including a rotable bearing on said outward side of said mount; and
   c) a torsion adjuster communicating with said housing.

16. The invention of claim 15 further comprising a groove in said slide.

17. The invention of claim 16 further comprising a rider in said mount.

* * * * *